W. HARLING.
MECHANICAL AMUSEMENT APPARATUS.
APPLICATION FILED MAY 15, 1909.

943,539.

Patented Dec. 14, 1909.
2 SHEETS—SHEET 1.

Witnesses

Inventor
Walter Harling,
By Victor J. Evans.
Attorney

W. HARLING.
MECHANICAL AMUSEMENT APPARATUS.
APPLICATION FILED MAY 15, 1909.
943,539.
Patented Dec. 14, 1909.
2 SHEETS—SHEET 2.
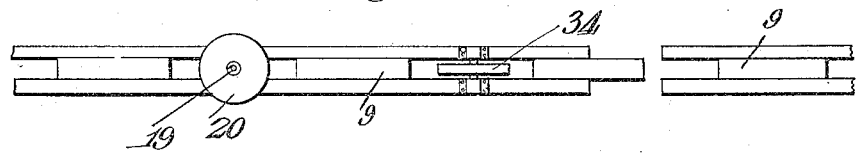
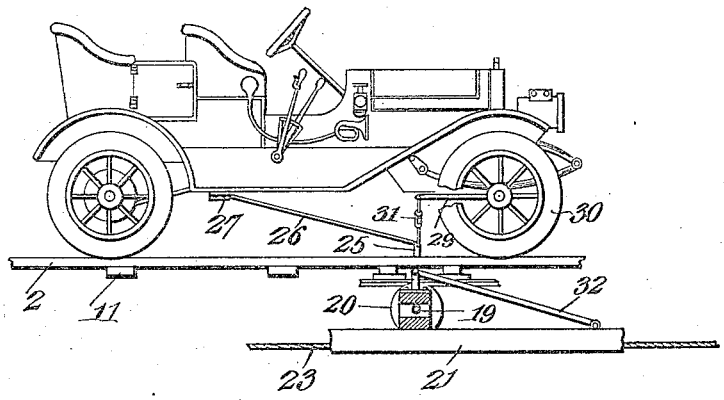
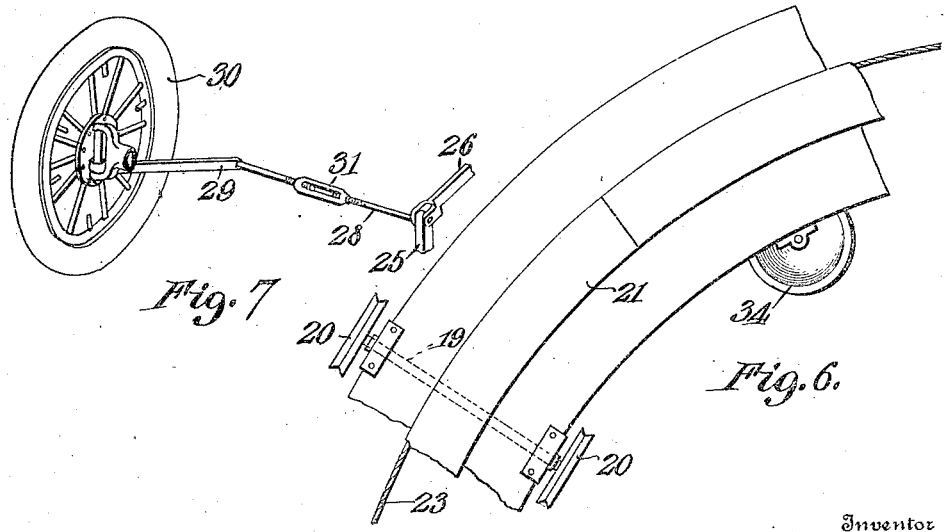
Witnesses
Inventor
Walter Harling,
By Victor J. Evans.
Attorney.

UNITED STATES PATENT OFFICE.

WALTER HARLING, OF TANNER, WASHINGTON.

MECHANICAL AMUSEMENT APPARATUS.

943,539.

Specification of Letters Patent. Patented Dec. 14, 1909.

Application filed May 15, 1909. Serial No. 496,128.

*To all whom it may concern:*

Be it known that I, WALTER HARLING, a citizen of the United States, residing at Tanner, in the county of King and State of Washington, have invented new and useful Improvements in Mechanical Amusement Apparatus, of which the following is a specification.

This invention relates to mechanical amusement apparatus, the object of the invention being to provide in connection with a circular track upon which a wheeled vehicle is adapted to be supported and propelled, novel and effective means for imparting rotary motion to a revolving element located adjacent to the track, and means for connecting the vehicle to said revolving element, causing the vehicle to travel in a circular path continuously around and upon the track.

The invention is particularly designed for demonstrating, exhibiting and advertising motor cars, automobiles and the like in public places.

With the above and other objects in view, the nature of which will more fully appear as the description proceeds, the invention consists in the novel construction, combination and arrangement of parts as herein fully described, illustrated and claimed.

Figure 1:
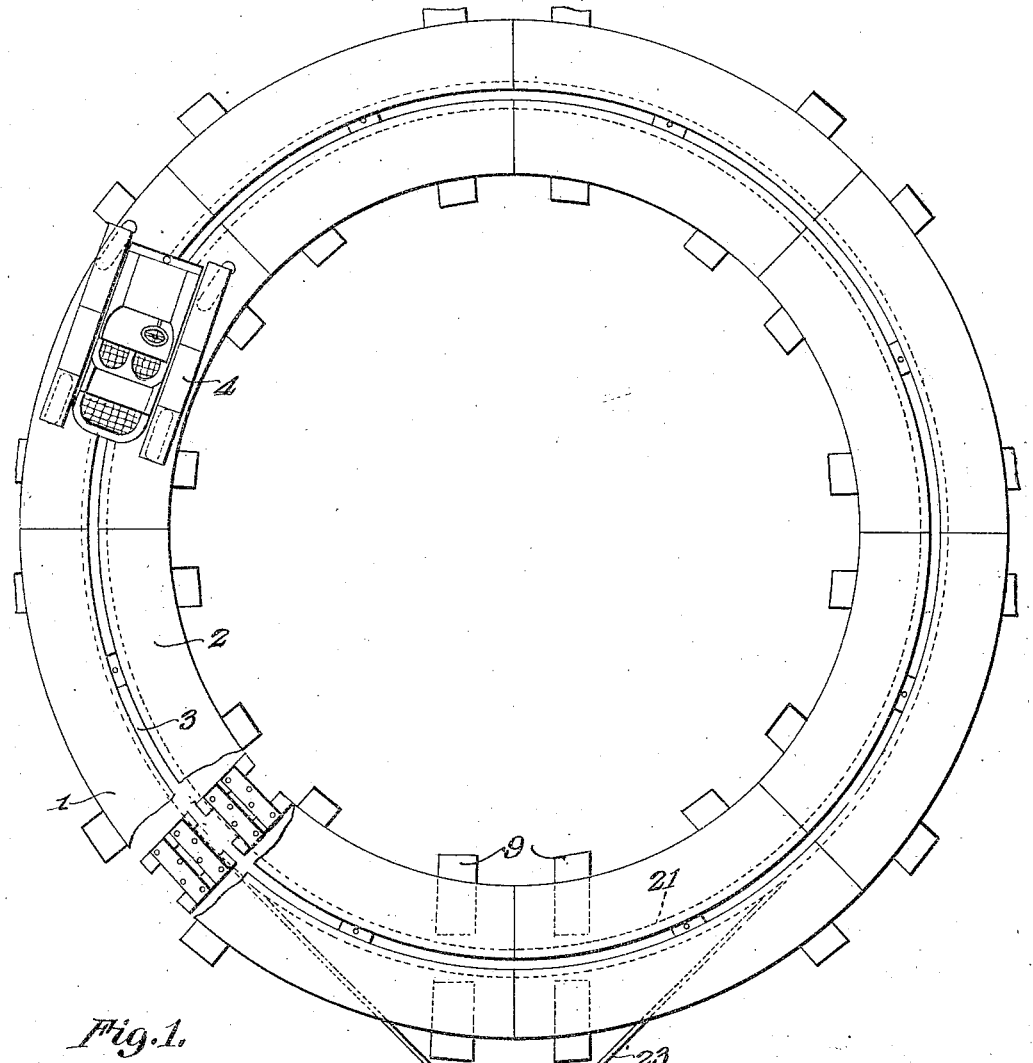
Figure 3:
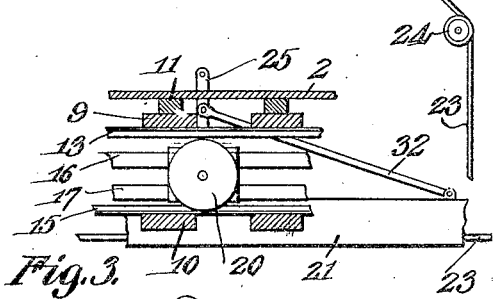
Figure 2:
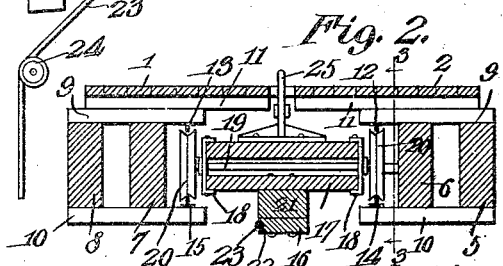

In the accompanying drawings:—Figure 1 is a plan view of the complete apparatus, showing the actuating cable leading to and from the track. Fig. 2 is an enlarged vertical cross section through a portion of the track. Fig. 3 is a detail longitudinal section on the line 3—3 of Fig. 2. Fig. 4 is an edge elevation of a portion of the revolving rim. Fig. 5 is a detail vertical section, showing an automobile mounted upon the track. Fig. 6 is a bottom plan view of the section of the revolving rim. Fig. 7 is a detail perspective view, showing the steering connection.

In carrying out the present invention, I provide a circular track illustrated in Fig. 1 comprising outer and inner concentric sections 1 and 2, respectively, the same being arranged at a suitable distance apart to leave an intervening slot 3, which provides for connecting the vehicle to an underlying revolving rim as will hereinafter appear. The sections 1 and 2 are preferably arranged flush with the floor or ground and are adapted to support the wheels of a motor car or automobile designated at 4 as shown in Fig. 1.

The supporting means for the track sections consist of a series of concentric circular frame pieces or wooden rails designated 5, 6, 7 and 8, being best illustrated in Fig. 2, wherein it will be observed that two of such circular frame pieces are arranged under each floor or track section 1 and 2 and each pair of said frame pieces is connected by top and bottom ties 9 and 10, respectively. Floor supports 11 are secured to the upper ties 9 as shown in Fig. 2 and underlie the track or floor sections 1 and 2 which are secured thereto in any convenient manner.

The inner ends of the ties 9 and 10 project beyond the inner faces of the circular frame pieces 6 and 7 and have secured thereto upper and lower concentric guide rails 12, 13, 14 and 15 as best illustrated in Fig. 2, said rails being designed to guide the revolving rim, a portion of which is illustrated in bottom plan view of Fig. 6 and in edge view or side elevation in Fig. 4. This revolving rim comprises upper and lower sections 16 and 17 connected together by end clips 18 which form bearings for a series of radial shafts 19. Each of said shafts is provided at its opposite ends with carrying wheels 20 which run upon the circular rails referred to, the weight being carried by the lower rails 14 and 15 while the upper rails 12 and 13 act as guard rails and also prevent tilting and binding of the revolving rim when more weight is placed on one side than on the other.

Extending downward from the bottom of the revolving rim is an annular shoe 21 grooved on one side as shown at 22 to receive an actuating cable 23 which, as shown in Fig. 1, passes around suitable guide pulleys 24 at one side of the track, said pulleys serving to direct the cable upon and off the shoes 21. This cable may be driven by any suitable motor.

Extending upward from the center of the revolving rim is a post 25 to which the motor car 4 is adapted to be connected in the manner illustrated in Figs. 5 and 7. In connecting the vehicle to said post, a draft rod 26 is extended from the upper end of the post 25 back to the bottom of the vehicle to which an attaching clip 27 is connected as indicated in Fig. 5. From the top of this same post 25 a longitudinally extensible connection 28 extends laterally off to a knuckle arm 29 connected to the steering knuckle of one of the front wheels 30 of the motor car or automobile. The connection 28 embodies oppositely arranged threaded sections which are connected about centrally by means of a turn buckle 31 which enables the connection 28 to be lengthened and shortened to impart the necessary angle to the steering wheels of the machine to cause the same to travel in a path concentric with the floor sections 1 and 2 above described. 32 designates a brace extending from the post 25 at a point beneath the track or floor sections 1 and 2 forward and downward to the frame revolving rim.

In order to guard against any friction between the revolving rim and the track sections, said rim may be provided on its inner side with wheels or rollers 34 adapted to move in contact with the adjacent surface of the circular frame piece 6 hereinabove described. The wheels 34 taken in connection with the wheels 20 above described render the revolving rim easy and smooth in its operation and prevent any possibility of cramping or binding between the parts referred to.

The apparatus above described is admirably adapted for displaying and advertising motor cars, automobiles and other similar vehicles at shows and other public entertainments.

I claim:—

1. Mechanical amusement apparatus comprising a circular track embodying concentric floor sections spaced apart leaving an intervening circular slot, a revolving annular rim operating in a plane beneath the floor sections and under said slot, a vehicle actuating post on the rim working in said slot, means for actuating said revolving rim, upper and lower circular series of ties, circular frame pieces connected by the ties, circular rails supported by the ties, and wheels on the rim engaging said rails and one of the circular frame pieces.

2. Mechanical amusement apparatus comprising a circular track embodying concentric floor sections spaced apart leaving an intervening circular slot, a revolving annular rim operating in a plane beneath the floor sections and under said slot, a shoe on said rim, a cable operatively engaging said shoe for driving the rim, and means for connecting a wheeled vehicle supported on the floor sections to said rim.

3. Mechanical amusement apparatus comprising a circular track embodying concentric floor sections spaced apart leaving an intervening circular slot, upper and lower series of ties, circular frame pieces connecting said ties, upper and lower circular rails carried by the ties, a revolving annular rim operating in a plane beneath the floor sections and under said slot, wheels on said rim running on said rails, means for imparting rotary motion to said rim, and means for connecting a wheeled vehicle supported on the floor sections to said post.

4. Mechanical amusement apparatus comprising a circular track embodying concentric floor sections spaced apart leaving an intervening circular slot, a revolving annular rim operating in a plane beneath the floor sections and under said slot, means for imparting rotary motion to said rim, a post on said rim working in the slot, and means for connecting a wheeled vehicle supported on the floor sections to said post, including a longitudinally extensible steering connection between said post and one of the steering wheels of the vehicle.

In testimony whereof I affix my signature in presence of two witnesses.

WALTER HARLING.

Witnesses:
 CABIN BRAY,
 ELMER W. SANDELL.